United States Patent [19]

Baurschmidt

[11] Patent Number: 4,674,883

[45] Date of Patent: Jun. 23, 1987

[54] MEASURING MICROSCOPE ARRANGEMENT FOR MEASURING THICKNESS AND LINE WIDTH OF AN OBJECT

[75] Inventor: Peter Baurschmidt, Aalen, Fed. Rep. of Germany

[73] Assignee: Carl-Zeiss-Stiftung, Heidenheim, Fed. Rep. of Germany

[21] Appl. No.: 772,177

[22] Filed: Sep. 3, 1985

[30] Foreign Application Priority Data

Sep. 1, 1984 [DE] Fed. Rep. of Germany ....... 3432252

[51] Int. Cl.[4] .................................... G01C 3/08

[52] U.S. Cl. ................................. 356/381; 356/384

[58] Field of Search ...................... 356/4, 381, 384; 250/560

[56] References Cited

U.S. PATENT DOCUMENTS 4,087,685 5/1978 Froot .............................. 250/302

4,201,475 5/1980 Bodlaj ............................ 356/381

*Primary Examiner*—Eugene R. LaRoche

*Assistant Examiner*—Robert J. Pascal

*Attorney, Agent, or Firm*—Walter Ottesen

[57] ABSTRACT

A measuring microscope arrangement is disclosed which includes a measuring microscope having a measuring head configured as a component which can be mounted on the microscope. The measuring head is suitable for the microdensitometric measurement of line widths as well as for the spectral interferometric measurement of thicknesses of objects such as semiconductor wafers, for example. In a first preferred embodiment of the arrangement of the invention, the object is scanned by displacing the object with the aid of a piezo table mounted on a scanning table utilized for obtaining a coarse position of the field of the object. The measuring microscope arrangement includes an objective for defining an intermediate image and the arrangement includes a measuring diaphragm mounted in the intermediate image. A diode-array spectrometer and an integral receiver are arranged behind the stationary diaphragm. A second preferred embodiment of the arrangement of the invention includes a further diode array in a second intermediate image plane in lieu of the integral measuring receiver. This further diode array is in addition to the diode-array spectrometer. In the second embodiment, a drive for the piezo table is unnecessary.

13 Claims, 8 Drawing Figures

74
75
70
71
73
79
77
72
78
76
82
85
91
86
88
84
90
80
83
81
89
87

MEASURING MICROSCOPE ARRANGEMENT FOR MEASURING THICKNESS AND LINE WIDTH OF AN OBJECT

FIELD OF THE INVENTION

The invention relates to a measuring microscope for determining linear dimensions of object details such as conductor paths in the semiconductor industry.

BACKGROUND OF THE INVENTION

The measurement of structures on wafers in the semiconductor industry is conducted pursuant to two different methods which are carried out sequentially.

The transverse measurements of structures such as the widths of conductor paths are determined by means of photometric measurements of the intensity distribution in the object plane on so-called microdensitometers. These microdensitometers are described, for example, in the publication entitled "Leitz-Mitteilungen for Wissenschaft und Technik", Volume 8, No. 3/4, pages 76 to 81. A description of these devices is also provided by U.S. Pat. No. 4,373,817. These devices are derived from microscope photometers and have a displaceable measuring slit of a few μm width and are mounted in the intermediate image plane. A photomultiplier is connected in cascade with these devices. The slit is moved in the intermediate plane for scanning the intensity distribution in the object plane with a required resolution of typically 10 to 100 nm. This affords the advantage with respect to scanning directly in the object plane of less precise requirements for guidings, temperature consistency et cetera since the object structures are imaged in the intermediate plane so as to be enlarged by the scale factor of the objective.

The thicknesses of layers of the structures are mostly determined on microspectral photometers by measuring the distance of interference minima and interference maxima in the spectrum of the light reflected from the object. Microspectral photometers for the semiconductor industry are described in U.S. Pat. No. 4,087,685.

As mentioned, the investigation of wafers, for example, in the semiconductor industry requires two different apparatus each with its own means for inserting the specimen and with its own computer evaluation and the like. The wafer to be investigated must be brought to each of the two apparatus with its cassette and be positioned anew under the microscope. This requires a relatively large expenditure of time and increases the space required and the danger of contamination of the wafer to be investigated.

Even though both types of apparatus include a microscope as part of their basic structure, it is not easily possible to combine the above-mentioned apparatus. This situation is present because the additional insertion of a spectrometer is made difficult by the slit component group movably mounted in the intermediate image in microdensitometers. On the other hand, the resolution of scanning tables, which are used for positioning measuring spots of the microspectral photometers, does not satisfy the requirements for the resolution of the scanning movement associated with the microdensitometry.

SUMMARY OF THE INVENTION

It is an object of the invention to provide an apparatus of the above-mentioned type on which both investigations can be conducted. More specifically, it is an object of the invention to provide such an apparatus wherein the microdensitometry and the microspectral photometry for examining wafer structures can be carried out with adequate precision and resolution. It is a further object to provide such an apparatus having a simple configuration and which can be realized by the addition of a few components to a conventional microscope and without extensive rebuilding.

According to a feature of the invention, the object is moved for the microdensitometry upon an additional unit for fine positioning which is placed on a scanning table displaceable in two coordinates for example. The measuring slit in the intermediate plane is stationary. With this embodiment, it is possible to mount a spectrometer behind the measuring slit and the spectrometer can be in the form of the so-called diode array spectrometer which functions without movable parts. The stationary diaphragm can be used directly as an inlet slit for the spectrometer.

However, it is preferable to provide a further measuring diaphragm in the plane of the pupil behind the diaphragm which is advantageously adjustable with respect to its width so that the magnitude of the measuring field and the resolution of the spectrometer can be selected independently of each other. The last-mentioned embodiment also affords the advantage of a higher sensitivity with respect to spectral measurements since the measuring diaphragm can be opened further in comparison to the low dimensions required for the microdensitometry so that the spectrometer will receive more light.

An additional integral measuring receiver such as a photomultiplier can be selected as a detector for obtaining the signal used in the microdensitometry. Light is directed to this receiver via a beam splitter or a switchable mirror which diverts light from the beam path for the spectral photometer. In addition, the grating of the spectral photometer itself can be utilized as a beam splitter in that the additional receiver is mounted with respect to the grating so that it only receives light of a zeroed diffracting order emanating from the grating.

However, it is especially advantageous if an electronic apparatus is provided which obtains the signal for the microdensitometry. For obtaining this signal, the signals corresponding to different wavelengths of several elements of a diode array are integrated and a measuring signal is formed therefrom. As a solution, the switchover from the spectral measurement to the thickness measurement of the wafers with respect to the microdensitometric width measurement is substantially achieved by purely electronic means, that is, entirely without mechanically moving parts if one does not consider a possible adaptation of the width of the measuring slit to increase the sensitivity for the spectral measurement.

Furthermore, for the microdensitometry, no additional detector is necessary. Rather, the same diode array serves for both measuring tasks as receiver.

For finely positioning the object with an accuracy sufficient for the microdensitometry of wafer structures, piezo electric displaceable table components of known construction are usable. By placing the piezo table on a conventional scanning table driven by a conventional step motor having a step width of, for example, 10 μm, enables the object to be coarsely scanned. The piezo table positioned in this manner provides the required resolution of typically 10 nm when scanned through a measuring slit within the object field.

A special advantage of the above described solution is that the scanning of the object takes place only on the optical axis of the microscope so that the distortion error of the objective does not affect the measuring precision. Furthermore, in this configuration it is possible to illuminate the stationary measuring slit with a minimum of stray light and to make visible for the observer in the viewing field of the microscope.

According to another feature of the invention, the intensity distribution in an image plane lying behind the first intermediate image plane by means of an additional intermediate image can be measured by means of a second diode array disposed at that location. This measurement is made in lieu of a mechanical scanning of the object plane.

A microscope with a diode array for photoelectric object scanning is known from examined German Patent Application No. DE-AS 22 11 235. In the known apparatus the diode array is, however, in the first intermediate image plane so that it is not easily possible to combine the known microdensitometer with a spectral photometer in the manner described.

A stationary diaphragm is mounted in the intermediate image plane which is, however, removable for the densitometry or is changeable in its dimensions (slit width). Preferably, the switching out or closing of the diaphragm is coupled with a switchover of the beam path from the diode-array spectrometer to the second additional diode array.

A diffraction grating of the spectrometer itself can be used as a beam splitter when the second diode array is mounted with respect to the grating so that it has the light diffracted in zero order. For the last-mentioned embodiment, the input slit of the monochromator is disposed in the intermediate image plane and is removed for the densitometric measurement.

BRIEF DESCRIPTION OF THE DRAWINGS

The invention will now be described with reference to the drawing wherein.

DESCRIPTION OF THE PREFFERED EMBODIMENTS OF THE INVENTION

Figure 1:
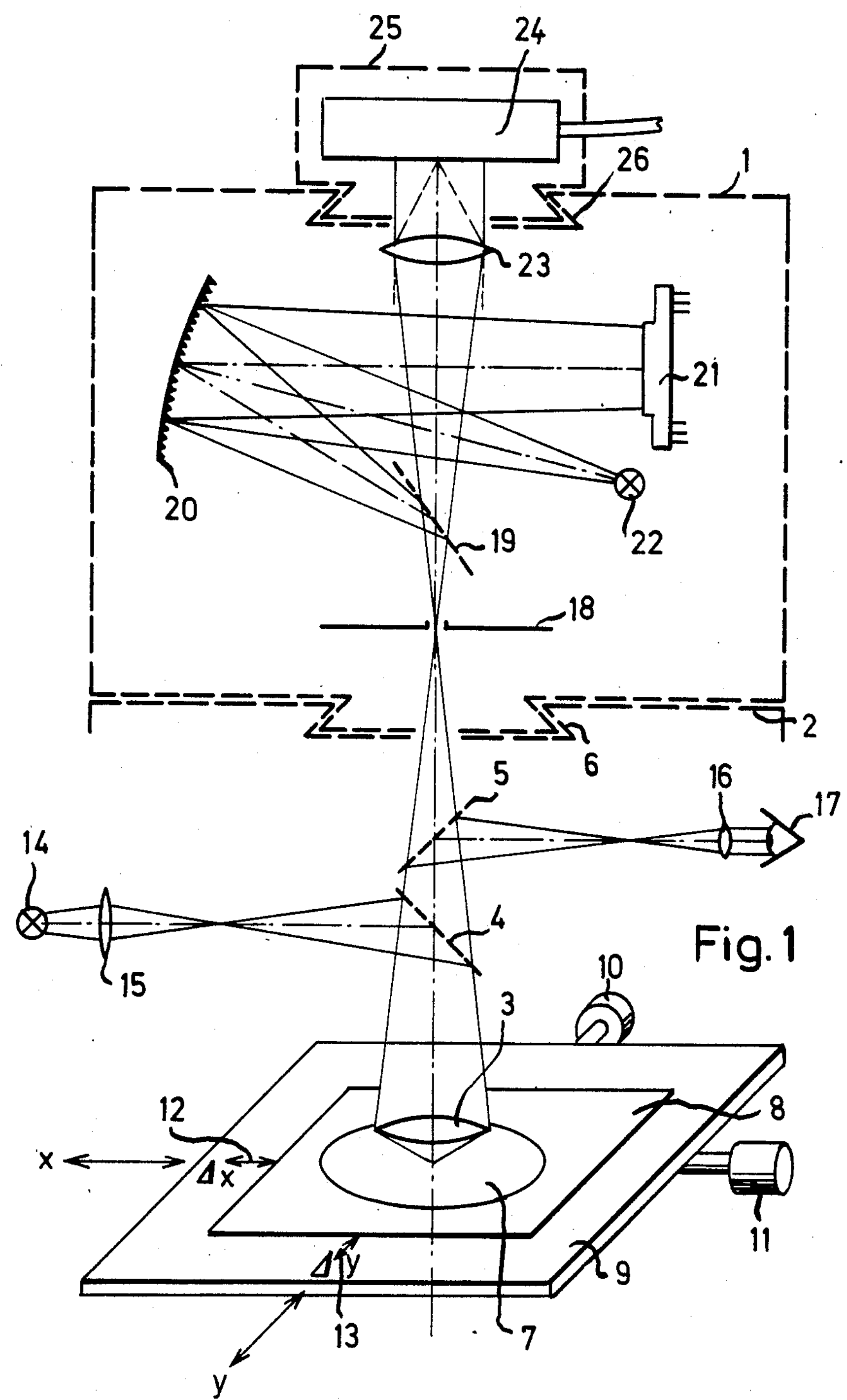
FIG. 1 is a schematic representation of the optical arrangement of a first embodiment according to the invention connected to a microscope.

The measuring microscope shown in FIG. 1 includes a base body of a conventional illuminating microscope which is schematically represented by the dashed line 2. The measuring microscope further includes an additional component 1 which is mounted atop the base body by means of a dove tail connection 6. The component 1 is for carrying out densitometric and spectral interferometric measurements.

The optics of the reflected light microscope will be discussed only briefly because such apparatus are known. The reflected light microscope includes an objective 3 and a semi-transparent mirror 4 arranged therebehind for reflecting in the light for illuminating a wafer 7 as well as a second semi-transparent mirror 5 for splitting the illuminating beam path to the ocular 16 and the component 1. The light for illuminating the wafer emanates from light source 14 and is collimated by collector 15. The microscope can also include a substage illuminating unit so that semiconductor masks can be measured. However, only the incident light beam path is shown here for the sake of clarity. Reference numeral 9 identifies a so-called scanning table which can be coarsely displaced via step motors 10 and 11 with a resolution of approximately 10 μm for scanning the wafer 7.

A measuring diaphragm 18 is mounted at the location in component 1 at which the intermediate image of the wafer 7 is formed by the objective 3. The diaphragm 18 is in the form of a narrow rectangular slit having the width of a few μm. For the densitometry, the intermediate image is moved over this measuring diaphragm 18 in that the wafer 7 itself is moved slightly with high resolution by means of a piezo table 8 disposed upon table 9. Reference numerals 12 and 13 identify the arrows which show this fine positioning $\Delta x$ and $\Delta y$ of the object. This fine positioning is superimposed on the coarse positioning affected by the scanning table 9. A piezo table having a resolution of better than 10 nm which is suitable for the above purpose is available in the marketplace under the designation "Piezo-Flex-Stage", Type 1a from Wye-Creek Designs of Frederick, Maryland. Such tables are also known from "Precision Engineering" 3(1) 1981, page 14 and "Review of Scientific Instruments" Volume 49 (1978), pages 1735 to 1740.

A semi-transparent mirror (beam splitter) 19 is mounted behind diaphragm 18. Downstream along the component beam path of the light which passes through beam splitter 19, there is disposed an optic 23 by means of which the pupil of the objective 3 is imaged on a photosensitive multiplier 24. This photosensitive multiplier 24 is fitted into a removable part 25 and is connected to component 1 by a further dove tail 26 for permitting an exchange.

The multiplier 24 is connected to an evaluation unit not shown. With the microdensitometric measurements (line width measurements), the course of the signal intensity of the light passing through diaphragm 18 is evaluated in dependence upon the positions $\Delta x$ or $\Delta y$ of the piezo table 8. If during the course of the scanning movement by means of piezo table 8, a line-like structure wanders over the diaphragm 18 in the intermediate image, then the signal characteristic illustrated in FIG. 5*b*, for example, will occur from which the line width can be determined.

Figure 5A:
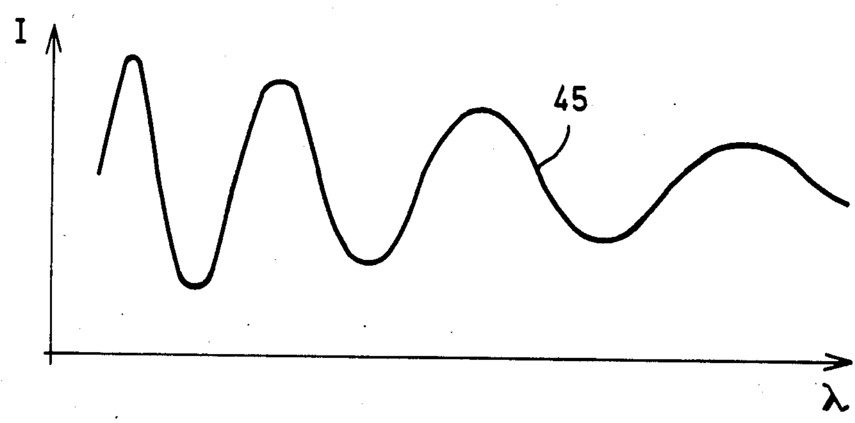
FIGS. 5*a* and 5*b* are graphical representations of the measuring signals delivered by the microscopes of FIGS. 1 to 4.

The light reflected from the beam splitter 19 is incident upon the concave reflection grating 20. A diode array 21 or a so-called charge coupled device array "CCD-array" is connected in cascade with grating 20 as a detector. The signals of the diode array 21, which is likewise connected with a storage oscillograph, deliver the spectral composition of the remitted light from the region of the object defined by the measuring diaphragm 18. The thickness of the wafer structure is determined by the position of the interference minima and interference maxima of the graphs in FIG. 5*a* which illustrate a typical output signal of the diode array 21.

The add-on part 1 further includes a light source 22 which is imaged by grating 20 in zero order of diffraction on the rear side of measuring slit 18. The measuring slit 18 illuminated from the rear in this manner is imaged on the object plane by the objective 3 and is therefore visible to observer 17.

Figure 2:
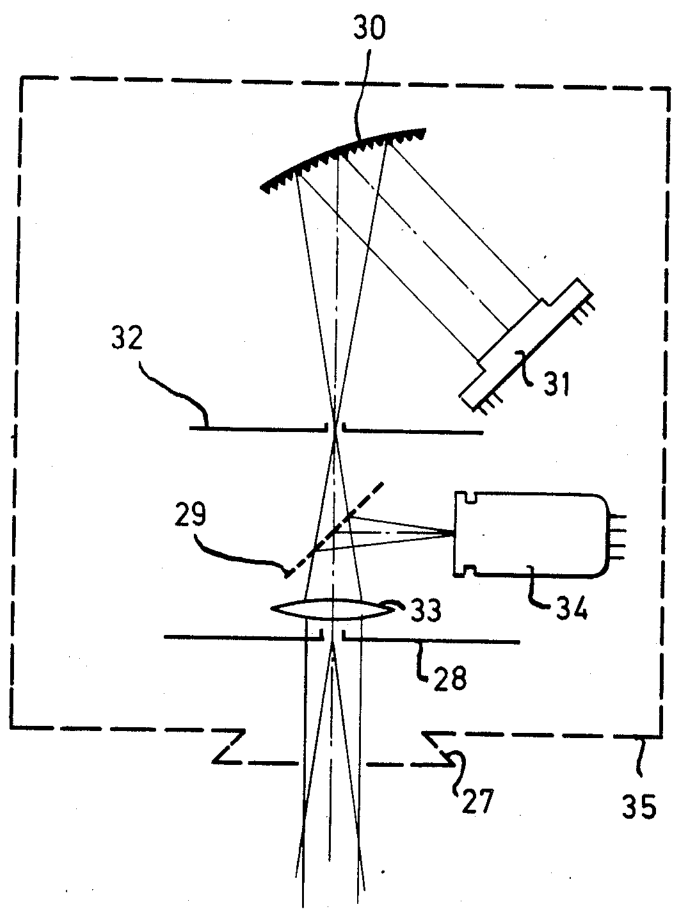
FIG. 2 is a schematic representation of the optical arrangement of a second embodiment utilized as an insert component in lieu of the insert component 1 shown in FIG. 1.

FIG. 2 shows an alternate embodiment 35 for the component 1 of FIG. 1. In component 35, the optic 33 is located directly behind the measuring diaphragm 28 which generates an image of the objective pupil on the surface of the multiplier 34. The multiplier 34 is arranged in the path of the component beam split off by the beam splitter 29. A further diaphragm 32 is mounted at the location of the pupil image in the beam path of the component beam passed by the beam splitter 29. Diaphragm 32 serves as an input slit for the spectrometer made up of concave grating 30 and a diode array 31. Both diaphragms 28 and 32 are adjustable with respect to their slit width. This arrangement affords the advantage that the width of the measuring slit via which the object region to be investigated is selected (diaphragm 28) and therefore the resolution with respect to microdensitometric line width measurement and also the width of diaphragm 32 determining resolution of spectrometer 30, 31 can both be adjusted independently of each other.

Figure 3:
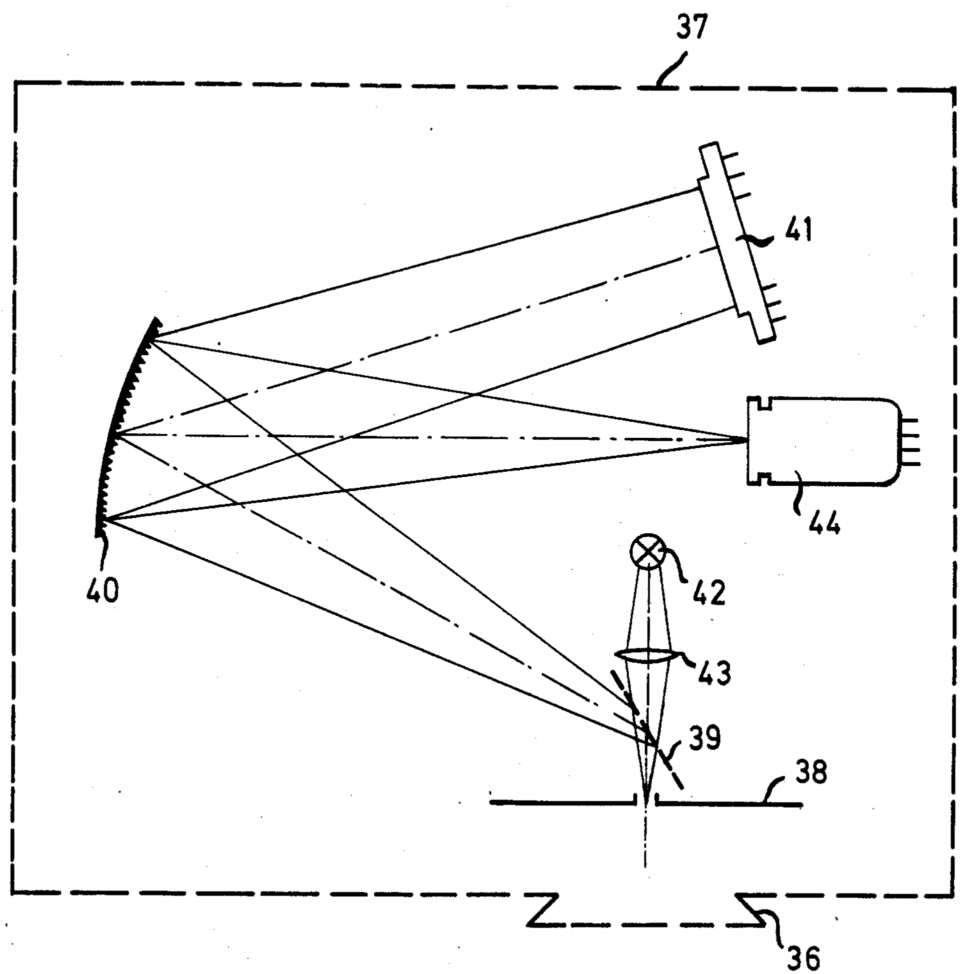
FIG. 3 is a schematic representation of an optical arrangement of a third embodiment wherein a further insert component is used in lieu of the component 1 shown in FIG. 1.

In a further alternative embodiment shown in FIG. 3, the photomultiplier 44, which serves as a receiver for the microdensitometry, is mounted in component 37 opposite grating 40 of the spectral photometer in such a manner that it receives the light of zeroed diffraction order coming from grating 40; whereas, the diode array 41 receives light as previously which can be diffracted in the first order for example. The grating 40 here itself functions as a beam splitter. A diaphragm 38 in the component 37 here serves as an input slit for the spectral photometer and simultaneously as a measuring slit for the densitometry. A mirror 39 which is partially transparent up to ten percent is mounted behind diaphragm 38 and serves on the one hand for deflecting the beam and on the other hand permits a rearward illumination of diaphragm 38 with the aid of light source 42 and the condenser 43.

Figure 4:
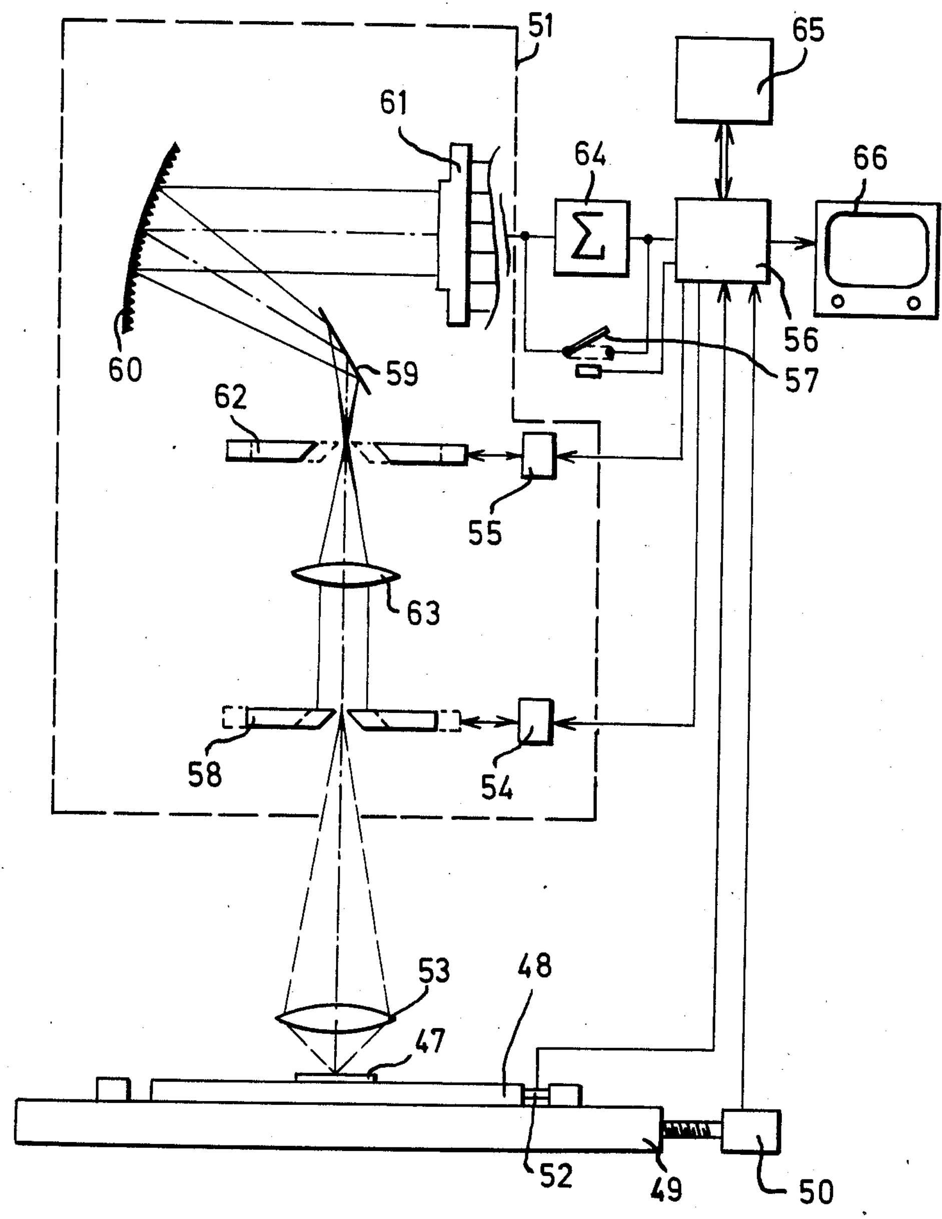
FIG. 4 is a schematic representation of a measuring microscope according to a fourth embodiment of the invention.

The measuring microscope shown in FIG. 4 according to a preferred embodiment of the invention again has a scanning table 49 coarsely movable via a drive 50 on which a piezo table 48 is placed for finely positioning the object such as a wafer 47. Drive 52 of the piezo table is likewise controlled from a central computer unit 56 as is the drive 50 of the scanning table. The optics of the base body of the microscope is illustrated in a simple manner and shows only the objective 53. With reference to the arrangement of an illuminating and visually observable beam path, reference is made to the corresponding components in FIG. 1.

The combined densitometry and spectral measuring head is again configured as a component unit in the same manner as in the previous embodiments as indicated by the outline 51.

A slit-like measuring diaphragm 58 is mounted on the input side at the location of the intermediate image formed by the objective 53. The measuring diaphragm 58 is adjustable in its width by means of an actuator 54 controlled by a computer 56. An optic 63 is located behind the measuring diagragm 58 for forming an intermediate image of the objective pupil at a position at which a further diaphragm 62 is mounted. The diaphragm 62 is likewise adjustable from a computer 56 with respect to its width via a second actuator 55. The diaphragm 62 serves as an input slit for the spectral photometer made up of a concave grating 60 and the diode array 61. A full mirror 59 disposed between diaphragm 62 and grating 60 simply serves for deflecting the beam.

The measuring head 51 includes no further detectors beyond the diode array 61. In lieu thereof, an integrator 64 is connected between the diode array 61 and the computer 56. The integrator 64 can be functionally eliminated by means of switch 57 when spectral measurements are made. A storage unit 65 and a monitor 66 are connected with the computer 56.

For carrying out a spectral interferometric layer thickness measurement, the measuring diaphragm 58 is selected by the computer 56 so as to be relatively large as indicated by the phantom positions shown in FIG. 4 and is positioned on the structure to be investigated by the observer. The input slit 62 is reduced to achieve a sufficient spectral resolution capacity (phantom position) and the integrator 64 is functionally disabled. Therefore, the spectrum 45 shown in FIG. 5*a*, for example, of a selected specimen point is shown on the monitor 66 when drives 50 and 52 are functionally quiescent.

Figure 5B:
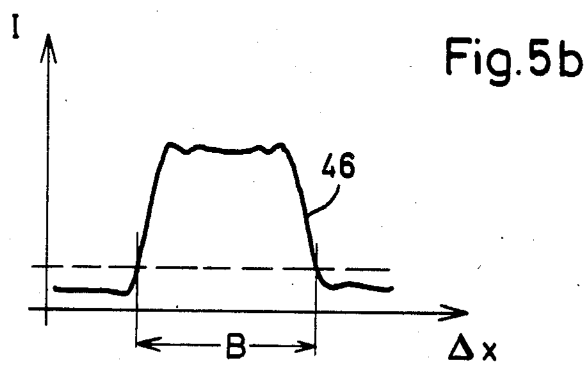

With a subsequent switching to a microdensitometric line width measurement, the measuring slit 58 is greatly reduced (solid line position), the input slit 62 is increased (solid line position) and the integrator 64 is functionally enabled. The integrator 64 adds the signals of the individual elements of the diode array 61. With a subsequent scanning of the object 47 by means of the piezo drive 52, the summation signal of all individual elements of the diode array 61 is stored in the memory 65 in dependence upon object position and displayed on the monitor 66 (FIG. 5*b*).

The embodiment according to FIG. 4 therefore only requires the diode array 61 as the only detector as well as for measuring line width and for measuring thickness. A high sensitivity for the densitometry is achieved in that the signals of a great many elements of the diode array 61 are summed. In this connection, the diaphragm 62 can be opened wide or can be entirely removed since with respect to densitometry, the information on the spectral distribution of the proven light is not of primary importance.

In contrast, the diaphragm 62 in its function as an input slit for the grating spectrometer 60 is pulled together to typically a width of 50 μm when spectral interferometric thickness measurements are made. Simultaneously, the measuring slit 58 of typically 10 μm width is enlarged for the densitometry to approximately 200 μm width; this corresponds to approximately 10 nm in the object plane. In this way, adequate light for a sensitive measurement is available also for the spectral photometry.

Figure 6:
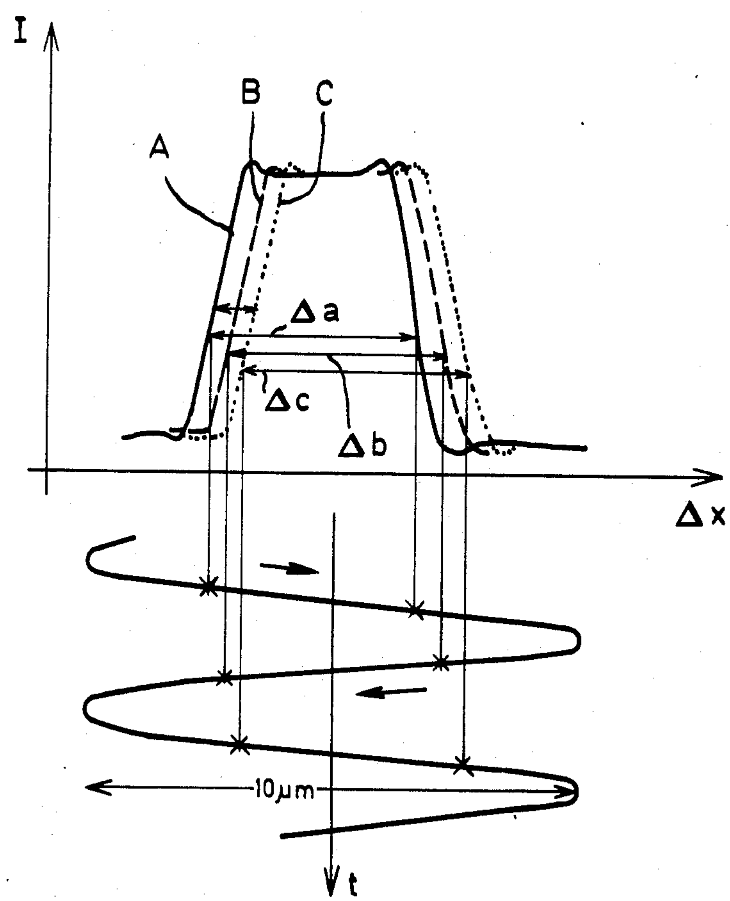
FIG. 6 is a graphical representation to emphasize the time relationship of the measuring signal of FIG. 5*b* in a modified embodiment of the microscope according to FIG. 4; and, FIG. 7 is a schematic representation of the optical arrangement of a fifth embodiment connected to a microscope.

The piezo drive 52 is modulated with an amplitude of approximately 10 μm at low frequency in order to prevent the occurrence of microdensitometry measuring failures during the scanning of the object 47 based on mechanical or thermal drift of the object 47 under the objective 53 or based upon hysteresis effects of the piezo drive 52. If the line structure which is to be measured as to its width is within the modulation swing, then the corresponding signals as shown in FIG. 6 are displaced with respect to each other. For determining the width of a linear structure from the signals A, B, and C et cetera appearing in time one next to the other, the edge spacings Δa and Δb or Δb and Δc are in each instance determined on mutually adjacent flanks of the modulation movement and the average value is obtained therefrom. The influence of the above-mentioned drift movements is then eliminated from the measurement of line width.

Figure 7:
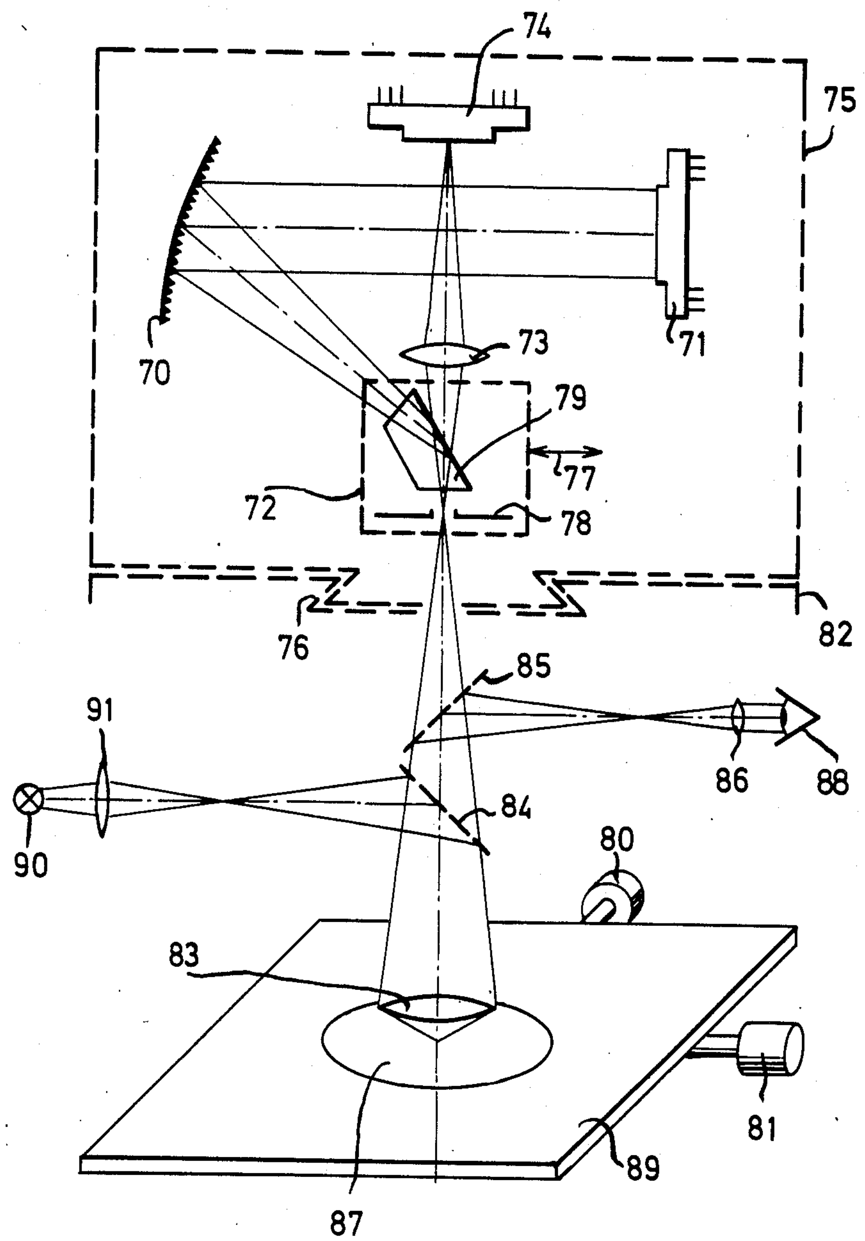

The embodiment illustrated in FIG. 7 for the measurement of line width and layer thickness of wafers requires no piezo table for fine positioning. The microscope has a base body identified by reference numeral 82 and has simply a scanning table 89 with step motors 80 and 81 for coarsely positioning the wafer 87 under the objective 83. The remaining components identified by reference numerals 84 to 88 correspond to those in the embodiment of FIG. 1.

The measuring head 75 is again configured as a separate component and is secured to the microscope 82 by means of a dove tail connection 76 to permit an exchange. A measuring diaphragm 78 which simultaneously serves as an input slit of the spectrometer is disposed at the location of the first intermediate image formed by the objective 83. The spectrometer includes a concave grating 70 and a diode array 71. A prism 79 for beam deflection is mounted between the grating 70 and the input slit 78. The slit 78 and the prism 79 are joined together as a unit 72 and can be removed from the beam path as indicated by arrow 77.

The intermediate image of the object 87 is again imaged on the surface of second diode array 74 by an optic 73 when the diaphragm 78 and the prism 79 are removed. This second diode array 74 delivers a signal which represents the intensity distribution of the light in the object plane and is therefore utilized for microdensitometric measurements.

If, in contrast, the component group 72 is inserted into the beam path, then the first diode array 71 delivers the signal course to be evaluated for the spectral interferometric thickness measurement.

Diode arrays 71 and 74 can be of different types and can be adapted with respect to the number of elements and element size to the measuring task at hand. Both arrays are connected to a common computer which takes care of the signal evaluation and forms the measurement results and illustrates the same graphically.

It is understood that the foregoing description is that of the preferred embodiments of the invention and that various changes and further modifications may be made thereto without departing from the spirit and scope of the invention as defined in the appended claims.

What is claimed is:

1. Measuring microscope arrangement for measuring thickness and line width of an object, the measuring microscope arrangement comprising:

a measuring microscope having a base;

an objective mounted in said base for defining an optical axis and for forming an intermediate image of the object;

a measuring component mountable on said base for measuring the spectral composition of the light coming from selected points of the object to determine the thickness of structures of the object and for photometrically measuring the intensity distribution in the object plane, said measuring component including:

a stationary diaphragm arranged on said optical axis and mounted in the plane of said intermediate image; and, detector means for detecting the light passing through said stationary diaphragm, said detector means being a diode-array spectrometer which includes a grating and a diode array having a plurality of elements disposed adjacent said grating;

coarse adjustment means mounted in said base for coarsely adjusting the position of the object to effect a coarse displacement of said intermediate image across said diaphragm;

fine adjustment means mounted in said base for finely adjusting the position of the object to effect a fine displacement of said intermediate image across said diaphragm; and, an electronic apparatus for forming an integral measuring signal for measuring the intensity distribution in the object plane from the signals of said elements of said diode array corresponding to the various wavelengths.

2. Measuring microscope arrangement for measuring thickness and line width of an object, the measuring microscope arrangement comprising:

a measuring microscope having a base;

an objective mounted in said base for defining an optical axis and for forming an intermediate image of the object;

a measuring component mountable on said base for measuring the spectral composition of the light coming from selected points of the object to determine the thickness of structures of the object and for photometrically measuring the intensity distribution in the object plane, said measuring component including:

a stationary diaphragm arranged on said optical axis and mounted in the plane of said intermediate image;

a diode-array spectrometer for detecting the light passing through said stationary diaphragm, an optic being mounted along said optical axis so as to be downstream of said stationary diaphragm and forming an intermediate image of the pupil of said objective; and, a further diaphragm having adjustable dimensions and being disposed in the plane of said last-mentioned intermediate image so as to serve as the inlet slit of said diode-array spectrometer;

coarse adjustment means mounted in said base for coarsely adjusting the position of the object to effect a coarse displacement of said intermediate image across said diaphragm, said coarse adjustment means including a table and means for displacing said table in two coordinates; and, fine adjustment means mounted in said base for finely adjusting the position of the object to effect a fine displacement of said intermediate image across said diaphragm, said fine adjustment means including a piezo table.

3. Measuring microscope arrangement for measuring thickness and line width of an object, the measuring microscope arrangement comprising:

a measuring microscope having a base;

an objective mounted in said base for defining an optical axis and for forming an intermediate image of the object;

a measuring component mountable on said base for measuring the spectral composition of the light coming from selected points of the object to determine the thickness of structures of the object and for photometrically measuring the intensity distribution in the object plane, said measuring component including:

a stationary diaphragm arranged on said optical axis and mounted in the plane of said intermediate image; and, a diode-array spectrometer for detecting the light passing through said stationary diaphragm, coarse adjustment means mounted in said base for coarsely adjusting the position of the object to effect a coarse displacement of said intermediate image across said diaphragm, said coarse adjustment means including a table and means for displacing said table in two coordinates;

fine adjustment means mounted in said base for finely adjusting the position of the object to effect a fine displacement of said intermediate image across said diaphragm, said fine adjustment means including a piezo table;

a further integral measuring receiver for making microdensitometric measurements and being associated with said measuring component; and, said measuring component further including a beam splitter for splitting the measuring light beam into a first component directed to said spectometer and a second component directed to said integral measuring receiver.

4. Measuring microscope arrangement for measuring thickness and line width of an object, the measuring microscope arrangement comprising:

a measuring microscope having a base;

an objective mounted in said base for defining an optical axis and for forming an intermediate image of the object;

a measuring component mountable on said base for measuring the spectral composition of the light coming from selected points of the object to determine the thickness of structures of the object and for photometrically measuring the intensity distribution in the object plane, said measuring component including:

a stationary diaphragm arranged on said optical axis and mounted in the plane of said intermediate image; and, a diode-array spectrometer for detecting the light passing through said stationary diaphragm, said diode-array spectrometer including a diode array and a grating disposed adjacent said diode array;

coarse adjustment means mounted in said base for coarsely adjusting the position of the object to effect a coarse displacement of said intermediate image across said diaphragm, said coarse adjustment means including a table and means for displacing said table in two coordinates;

fine adjustment mounted in said base for finely adjusting the position of the object to effect a fine displacement of said intermediate image across said diaphragm, said fine adjustment means including a piezo table;

an integral measuring receiver associated with said measuring component and being mounted with respect to said grating so as to receive light coming therefrom in zeroed diffracting order.

5. The measuring microscope arrangement of claim 4, said component further including a light source for directing light to said diaphragm via said grating thereby illuminating the region of said diaphragm facing away from said objective.

6. The measuring microscope arrangement of claim 5, comprising means for imparting periodic oscillations to said piezo drive means when measuring said intensity distribution.

7. The measuring microscope arrangement of claim 4, said piezo table being configured as a holder for holding the object and being placeable on said first-mentioned table, said fine adjustment means further comprising piezo drive means for finely adjusting the position of said holder.

8. Measuring microscope arrangement for measuring thickness and line width of an object, the object defining an object plane, the measuring microscope arrangement comprising:

a measuring microscope defining a beam path for a measuring beam and including an objective for forming an intermediate image of the object in a first intermediate image plane;

a component mountable on the microscope for photometrically measuring the intensity distribution in said object plane to determine transverse dimensions and for measuring the spectral composition of the light coming from selected points of the object to determine the thickness of object structures;

a measuring diaphragm having changeable dimensions and being mounted in said first intermediate image plane;

said measuring microscope further including an optic for imaging the intermediate image of said object in a second intermediate image plane behind said first intermediate image plane;

said component including a diode-array spectrometer mounted behind said diaphragm and a diode array mounted in said second intermediate image plane for determining said intensity distribution in said object plane;

said diode-array spectrometer including a grating and a diode array mounted adjacent to said grating; and, beam splitting means for splitting the measuring beam from the object into a first component beam directed to said diode array of said spectrometer via said grating and into a second component beam directed to said diode array mounted in said second intermediate image plane.

9. The measuring microscope arrangement of claim 8, said beam splitting means being a mirror, said mirror and said diaphragm being coupled together so as to permit the same to be removed and inserted into said beam path of said measuring beam.

10. Measuring microscope arrangement for measuring thickness and line width of an object, the object defining an object plane, the measuring microscope arrangement comprising:

a measuring microscope defining a beam path for a measuring beam and including an objective for forming an intermediate image of the object in a first intermediate image plane;

a component mountable on the microscope for photometrically measuring the intensity distribution in said object plane to determine transverse dimensions and for measuring the spectral composition of the light coming from selected points of the object to determine the thickness of object structures;

a measuring diaphragm having changeable dimensions and being mounted in said first intermediate image plane;

said measuring microscope further including an optic for imaging the intermediate image of said object in a second intermediate image plane behind said first intermediate image plane;

said component including a diode-array spectrometer mounted behind said diaphragm and a diode array mounted in said second intermediate image plane for determining said intensity distribution in said object plane;

said diode-array spectrometer including a grating and said diode array in said second intermediate image plane being mounted with reference to said grating so as to receive the light leaving said grating in zeroed diffracting order.

11. Measuring microscope arrangement for measuring thickness and line width of an object, the object defining an object plane, the measuring microscope arrangement comprising:

a measuring microscope defining a beam path for a measuring beam and including an objective for forming an intermediate image of the object in a first intermediate image plane;

a component mountable on the microscope for photometrically measuring the intensity distribution in said object plane to determine transverse dimensions and for measuring the spectral composition of the light coming from selected points of the object to determine the thickness of object structures;

a measuring diaphragm movably mounted in said first intermediate image plane so as to be movable between a first position in said beam path and a second position outside of said beam path;

said measuring microscope further including an optic for imaging the intermediate image of said object in a second intermediate image plane behind said first intermediate image plane;

said component including a diode-array spectrometer mounted behind said diaphragm and a diode array mounted in said second intermediate image plane for determining said intensity distribution in said object plane;

said diode-array spectrometer including a grating and a diode array mounted adjacent to said grating; and, beam splitting means for splitting the measuring beam from the object into a first component beam directed to said diode array of said spectrometer via said grating and into a second component beam directed to said diode array mounted in said second intermediate image plane.

12. The measuring microscope arrangement of claim 11, said beam splitting means being a mirror, said mirror and said diaphragm being coupled together so as to permit the same to be removed and inserted into said beam path of said measuring beam.

13. Measuring microscope arrangement for measuring thickness and line width of an object, the object defining an object plane, the measuring microscope arrangement comprising:

a measuring microscope defining a beam path for a measuring beam and including an objective for forming an intermediate image of the object in a first intermediate image plane;

a component mountable on the microscope for photometrically measuring the intensity distribution in said object plane to determine transverse dimensions and for measuring the spectral composition of the light coming from selected points of the object to determine the thickness of object structures;

a measuring diaphragm movably mounted in said first intermediate image plane so as to be movable between a first position in said beam path and a second position outside of said beam path;

said measuring microscope further including an optic for imaging the intermediate image of said object in a second intermediate image plane behind said first intermediate image plane;

said component including a diode-array spectrometer mounted behind said diaphragm and a diode array mounted in said second intermediate image plane for determining said intensity distribution in said object plane;

said diode-array spectrometer including a grating and a diode array mounted adjacent to said grating; and, beam splitting means for splitting the measuring beam from the object into a first component beam directed to said diode array of said spectrometer via said grating and into a second component beam directed to said diode array mounted in said second intermediate image plane.

* * * * *

UNITED STATES PATENT AND TRADEMARK OFFICE

CERTIFICATE OF CORRECTION

PATENT NO. : 4,674,883

DATED : June 23, 1987

INVENTOR(S) : Peter Baurschmidt

It is certified that error appears in the above-identified patent and that said Letters Patent is hereby corrected as shown below:

In column 10, line 1: after the word "adjustment", please add -- means --.

Signed and Sealed this

Fifth Day of January, 1988

*Attest:*

DONALD J. QUIGG

*Attesting Officer* *Commissioner of Patents and Trademarks*